United States Patent [19]

Mottola et al.

[11] Patent Number: 5,745,885
[45] Date of Patent: Apr. 28, 1998

[54] DATA STORAGE MEDIUM FOR FUNDING EDUCATION BY ACQUIRING SHARES OF STUDENTS' FUTURE EARNINGS

[75] Inventors: Anthony J. Mottola, Massapequa; Julius Cherny, Monsey; Roy C. Chapman, Woodbury, all of N.Y.

[73] Assignee: Human Capital Resources, Inc., New York, N.Y.

[21] Appl. No.: 449,095

[22] Filed: May 24, 1995

Related U.S. Application Data

[63] Continuation-in-part of Ser. No. 422,766, Apr. 14, 1995, abandoned, which is a continuation of Ser. No. 134,314, Oct. 8, 1993, abandoned.

[51] Int. Cl.⁶ ..................................................... G06F 17/60
[52] U.S. Cl. .............................................. 705/38; 705/36
[58] Field of Search .................................. 395/235, 236, 395/238; 235/379; 705/35, 36, 38

[56] References Cited

U.S. PATENT DOCUMENTS

| | | |
|---|---|---|
| 4,722,055 | 1/1988 | Roberts . |
| 4,839,804 | 6/1989 | Roberts et al. . |
| 4,876,648 | 10/1989 | Lloyd . |
| 5,220,500 | 6/1993 | Baird et al. ............ 364/408 |
| 5,239,462 | 8/1993 | Jones et al. . |
| 5,262,941 | 11/1993 | Saladin et al. . |
| 5,361,201 | 11/1994 | Jost et al. . |

OTHER PUBLICATIONS

M. Nerlove, "Some Problems in the Use of Income–Contingent Loans ...", Journal of Political Economy, 1975, vol. 83, No. 1 pp. 157–183.

Albrecht et al., "Student Loans: An Effective Instrument for Cost Recovery ...", World Bank Research Observer, vol. 8 No. 1, Jan. 1993 pp. 71–90.

Hood, J., "How To Hold Down College Tuition Costs", Consumers Research Magazine, vol. 76, No. 10 pp. 10–15.

*Primary Examiner*—Robert A. Weinhardt
*Attorney, Agent, or Firm*—Fish & Neave; Jeffrey H. Ingerman

[57] ABSTRACT

A data processing system and method for administering a plan for funding investments in education is provided. The education investment plan includes a unit investment trust for financing the educations of a predetermined number of students pursuing careers in preselected fields of study. The data processing system selects students for participation in the plan by comparing their application responses in various categories, weighted according to a predetermined weighting scheme, to stored weighted criteria for the same categories. The education of accepted students is paid for by funds invested in the plan by investors. The students agree to assign a percentage of their future income for a limited time period to the plan, generating a return for the investors. Students are monitored throughout their education and employment until their obligations are discharged, with the results of the monitoring used to adjust, as necessary, the acceptance criteria. In order to offer the plan, plan earnings are projected based on multiple variables, and the projection may be performed according to statistical equations, or may be performed iteratively with a different variable varied during each iteration. A data storage medium encoded with a set of instructions for performing the method is also provided.

25 Claims, 10 Drawing Sheets

DATA STORAGE MEDIUM FOR FUNDING EDUCATION BY ACQUIRING SHARES OF STUDENTS' FUTURE EARNINGS

CROSS REFERENCE TO RELATED APPLICATIONS

This is a continuation-in-part of commonly-assigned U.S. patent application Ser. No. 08/422,766, filed Apr. 14, 1995, now abandoned which is a continuation of U.S. patent application Ser. No. 08/134,314, filed Oct. 8, 1993, now abandoned.

BACKGROUND OF THE INVENTION

This invention relates to a method and apparatus for funding education. More particularly, this invention relates to a method and apparatus for implementing and administering a plan of investments for financing higher education.

Student loan plans have been used as one form of assistance to allow students to finance the cost of post-secondary school education, including college, graduate and professional education. Such loan plans include the Stafford Loan Program, Perkins Loan Program, Supplemental Loans for Students (SLS) and Parent Loans for Undergraduate Students (PLUS), as well as a wide variety of private and campus-based plans. The implementation and administration of such plans and others, however, suffer from a number of drawbacks.

First, upon graduation from a college or university, a student-borrower can often be confronted with a loan repayment schedule which represents a significant portion of the student-borrower's after-tax salary. Loan repayment schedules generally do not take into consideration the salary earned by the student-borrower. For example, after graduation, the amount a student-borrower repays each month is generally a fixed amount which is independent of the student-borrower's salary. Thus, the smaller a student-borrower's salary, the more likely the student-borrower will be unable to meet his or her education-related loan repayment financial obligations and default.

Second, the availability of low-interest funds for the financing of a college education can be limited. For example, it can be difficult to obtain low-interest student loans to cover the full cost of an education. In particular, there are very few, if any, plans wherein a student can obtain a single loan to cover a full year of education-related expenses, let alone a complete four-year degree.

Third, most student loan plans do not take into consideration the needs of industry or society. For example, the availability of financial assistance for particular fields of study is generally not correlated with those sectors of industry in which there is a larger demand for qualified and educated employees in those fields. In other words, although industry and society may benefit from a larger number of students pursuing a particular career, such a need does not generally drive the availability of funding for such students.

Fourth, current plans for financing higher education are insensitive to the quality of the education being financed. A student otherwise meeting the qualifications of the particular plan receives financing under the same terms regardless of what institution he attends. This does nothing to foster excellence among educational institutions.

In light of the above, it would be desirable to be able to provide an apparatus and method for implementing and administering an improved plan for funding higher education.

It would also be desirable to be able to provide an apparatus and method for implementing and administering a higher education funding plan in which the availability of funds is less limited and the likelihood of student default is reduced.

It would further be desirable to be able to provide an apparatus and method for implementing and administering a higher education funding plan in which the availability of financial assistance for particular fields of study is driven by market demand for employees skilled in such fields.

It would still further be desirable to be able to provide an apparatus and method for financing higher education in a way that furthers excellence among educational institutions.

SUMMARY OF THE INVENTION

It is an object of this invention to provide an apparatus and method for implementing and administering an improved plan for funding higher education.

It is also an object of this invention to provide an apparatus and method for implementing and administering a higher education funding plan in which the availability of funds is less limited and the likelihood of student default is reduced.

It is a further object of this invention to provide an apparatus and method for implementing and administering a higher education funding plan in which the availability of financial assistance for particular fields of study is driven by market demand for employees skilled in such fields.

It is a still further object to provide an apparatus and method for financing higher education in a way that furthers excellence among educational institutions.

In accordance with this invention there is provided a data processing method for administering a plan for funding education of a plurality of students, each of said students studying in one of a plurality of fields of study at one of a plurality of educational institutions. In accordance with the method, earnings of the plan are projected by at least one of (a) projecting employment and earnings opportunities for students in those fields of study, (b) projecting employment and earnings opportunities for graduates of those educational institutions, (c) limiting students to one or more particular fields of study, (d) limiting students to one or more particular educational institutions, and (e) creating at least one set of application criteria for acceptance of students into the plan, the application criteria being for predicting success of individual students in one or more of the fields of study. Application responses from each of the students are collected and stored. Students are accepted into the plan based on the application responses. Sufficient funds are collected from investors to fund at least a portion of the education of each of the accepted students. An amount of student earnings is purchased on behalf of the investors in return for a predetermined payment for the student's education, the purchased earnings comprising a predetermined portion of earnings of each respective accepted student. An amount of the purchased earnings is paid to the investors after subtracting administrative and other costs from total purchased earnings received from accepted students.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
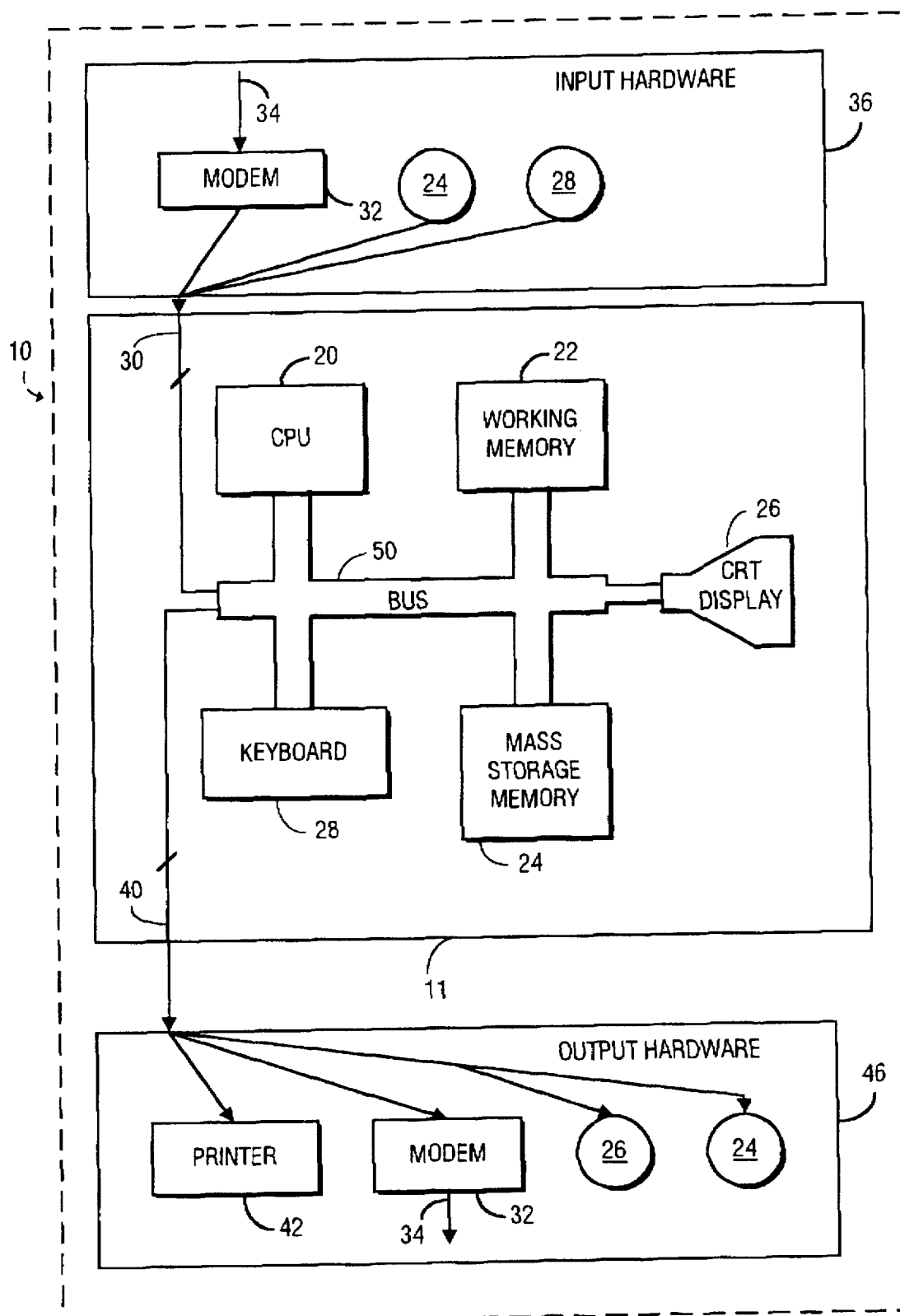
FIG. 1 is a schematic representation of a first preferred embodiment of a hardware system according to the invention.

The education funding plan described herein relies on the pooling of funds from a plurality of investors or shareholders, to provide the necessary funds for financing the educations of a predetermined number of students in pre-selected educational programs (e.g., particular fields of study or particular educational institutions). Students selected for the plan have their educations financed by the investors in exchange for predetermined portions of the students' future earnings, after graduation and securing employment. In other words, the investors, in effect, purchase a portion of each student's future expected earnings resulting from the education financed by the investors.

Any desired mechanism can be used to form a pool of investors according to the invention. In the discussion that follows, the term "unit investment trust" is defined to mean a pool of money invested in a portfolio of particular students who are planning on pursuing particular educational programs, wherein the students, in exchange for the financing of their educations by the unit investment trust, transfer to the trust predetermined portions of their earnings. All funds received from students are paid out by the unit investment trust's trustee—e.g., a bank or trust company—to the shareholders in the unit investment trust, net of expenditures. Because the composition of the portfolio is preferably fixed, that is, the particular students participating in the education investment plan are preferably fixed, there is generally no continuing active management of the unit investment trust. A "unit investment trust" can include closed or open-ended investment companies (e.g., mutual funds), limited partnerships or other types of investment plans as appropriate.

In order for the plan according to the invention to be successful, it must be able to select, from among many applicants, those students who are likely to succeed in their education and attain sufficient grades to secure employment at a rate of remuneration sufficient to generate attractive returns for the investors. Accordingly, applicants for the plan are required to complete an application which seeks, in addition to identifying information and education and employment histories, detailed information regarding an array of factors deemed to be useful in predicting their likelihood of future success. Such factors may vary from plan to plan, but can include factors such as Scholastic Aptitude Test scores (verbal and mathematical), high school grade point averages broken down by junior and senior years, high school class rank, number of extracurricular activities participated in, and average grades in various particular high school subjects, as well as other factors as may be deemed appropriate. If the student is applying for financing for graduate or professional education, information regarding college performance, in categories similar to those requested regarding high school performance, may also be required.

The information gathered from the student applicants is used to create a "success profile" for each applicant. The success profile preferably is obtained by applying a set of weighting factors to the various criteria reported on the application. The weights can be based on empirical observations, statistical analysis of past student performance, or a combination thereof. The success profile is compared to a stored profile that is based on statistical analysis of past performance by previous participants, as well as statistical predictions (when the plan is first begun, only the latter are available). Preferably, information about the performance of current participants is entered into the system frequently or continually, and the stored profile is updated as a result.

Success profiles differ depending on the field of study the student is seeking to enter. For example, a demonstrated aptitude in mathematics may be important in the natural sciences, while command of language is important for a literary career. Linear algebraic techniques can be used to create a multivariate linear regression model which yields a matrix having as one dimension the number of different careers supported by the system, and as its other dimension the number of criteria for which applicants are asked for responses. The terms of the matrix are weighted criteria. Each row of that matrix can be considered a vector of weighted criteria for a given field.

In particular, a given student profile (SP) is the result of a statistical analysis of student qualities that are most likely to be associated with a student succeeding in a given field or major. For example, it is generally agreed that a student who possesses a mind that has been trained to be adept with mathematics has a greater likelihood of achieving success in a science-related career. It is also apparent that command of language is an important requirement for success in literary related activities. A computed SP which can be denoted as $SP_i$ (i=1, 2, . . . .) is preferably a result of a multivariate linear regression model:

$$Y = Z \beta + \epsilon,$$
$$(n \times 1) \quad (n \times (r+1)) \quad ((r+1) \times 1) \quad (n \times 1)$$

-continued $$E(\epsilon) = 0, \text{ and } Cov(\epsilon) = \sigma^2 1,$$
$$(n \times 1) \quad\quad\quad (n \times n)$$

where $\beta$ and $\sigma^2$ are unknown parameters and the design matrix Z has jth row $[Z_{j0}, Z_{j1}, \ldots, Z_{jr}]$,
where the Y=current income derived from engaging in a chosen career, and where:

Z   =   vector of inputs that are supplied by students prior to acceptance into college/university.

For example:
$Z_1$ = SAT verbal score
$Z_2$ = SAT quantitative score
$Z_3$ = high school grade point average for junior year
$Z_4$ = high school grade point average for senior year
$Z_5$ = class standing
$Z_6$ = number of extra curricular activities
$Z_7$ = average grade in high school math courses
$Z_8$ = average grade in high school language courses
$Z_9$ = average grade in high school social studies courses
$Z_{10}$ = average grade in high school humanities courses
.
.
.
$Z_r$ = ...

The model produces a vector $\beta$ of weights on the $Z_i$ that points up which are the dominant variables for a given career path. Accordingly, an $SP_i$ represents those variables which are most significantly related to the success of someone undertaken career path i.

When a student completes an application and the various criteria responses are extracted from the application, a score for that student can be computed for any chosen field. Each such score, for a given field, is the sum over the number of criteria of the product of each criterion response with its predetermined weight. (The predetermined weights preferably also are derived from the statistical model.) Normally, the student will have applied in one particular field, and so only that score will be computed. The computed score will be compared to the minimum success profile predicted by the statistical model, and the student will be admitted to the plan if the score equals or exceeds the predicted score.

In particular, students preferably are selected for a particular pool (e.g., one limited by institution or field) by ranking them through the career-related $SP_i$ where $$\text{student score } (ST) = \sum_{i=1}^{n} W_i X_i$$

and each $X_i$ = a respective student's response in his/her application to the relevant variables as specified in the $Sp_i$ The students may be rank ordered by their STs from lowest to highest. Students preferably are selected for a given pool from those students that have STs that exceed a previously determined threshold.

Another requirement for the plan according to the invention to be successful is the ability to determine how much of a return can be generated by investments in educations in different fields of endeavor, so that the plan can be made sufficiently attractive to investors that they will invest in the plan. Accordingly, in setting up the plan, in order to describe it to potential investors—e.g., in a prospectus or other offering document, the system according to the invention determines, based on a number of different factors, what the expected return will be. The factors considered include, in addition to the various different particular fields of study, such things as predictions of incomes for different fields, likely rates of salary growth, likely periods of unemployment, drop-out rates, etc. Because of the large number of variables to be considered, the system preferably iteratively calculates the projected return, varying one variable at a time, to reach the final result.

In accordance with the present invention, a particular unit investment trust predetermined "educational program" can take on a variety of forms. For example, the educational program can be a program to educate school teachers, engineers or accountants, to name a few. Additionally, such programs may also be restricted to particular educational institutions (e.g., a particular local university or community college) or particular students. Moreover, the educational programs described herein may also be graduate or professional programs for training, for example, doctors, lawyers or scientists. Of course, many other education programs than those specifically described herein can also be administered by the present invention.

Although the student selection portion of the plan has been described herein prior to the earnings projection for a particular unit investment trust, the earnings projection portion may be performed first, to enable one to set up the unit investment trust so that students can apply and be accepted. In particular, where the unit investment trust is limited to a certain field, one would want to know the projected earnings in such a field before investors would agree to invest, and only after the pool was established could one then evaluate student prospects who are interested in that field. On the other hand, definitive projections for the investors cannot be made until the actual student population has been selected.

A preferred model for forecasting future employment prospects preferably attempts to incorporate the important demographic, social and economic relationships or equations. The inputs into the model preferably are of two kinds: (1) objective time series data—e.g., G.N.P. and annual births, and (2) subjective estimates that represent the model-user's informed surmise of future states of society.

The model preferably also relies on data that colleges and universities collect with respect to how well their alumni have done in the past. These statistics usually include the kinds of careers entered into by alumni, average earnings, accomplishments (e.g., Nobel winners and political office), and distinguished activities such as high profile committee membership (e.g., the President's Advisory Committee on science or education for the 21st Century).

The establishment of a student profile, as discussed above, may result from an analysis that is related to the proposed offering. Such a student profile would preferably describe the qualities and accomplishments that most likely achieve the goals of the prospective investors. Each offering preferably will be built around a particular student profile. Some examples are (1) Harvard doctors; (2) St. John's University lawyers; (3) top ten medical school doctors; (4) Ivy league undergraduates; (5) undergraduates above a set of criteria in a given institution; and (6) a group of students/investees from a geographically distributed group of schools. There is an enormous variety of programs that could be fashioned. The determining factor is what people are willing to invest in.

One goal of the plan according to the invention is the optimal allocation of society's resources devoted to higher education. To achieve this goal, the plan preferably, to the greatest degree possible, anticipates the types of skills and training that will be demanded in the labor markets of the future. The connection between economics and education has been generally accepted. What is missing from the overall educational system is a mechanism that causes institutions of higher learning to educate current generations for future productive employment. The plan's success in achieving this goal is very much related to its ability to forecast society's future labor force needs. The plan should preferably put in place appropriate mechanisms to forecast the long range needs of society.

To satisfy its forecasting needs the plan preferably combines scientific and judgmental approaches in one computerized model. The model preferably has three basic ingredients—theory, historical fact and expert judgments regarding forces and current policies that will have the effect of altering existing trends.

The preferred form of the forecasting model is an algebraic, linear (in parameters) stochastic model. The model has g endogenous (jointly dependent) variables $y_1, y_2, \ldots, y_g$ and k predetermined (exogenous or lagged endogenous) variables $x_1, x_2, \ldots, x_k$ and is written as:

$$y_1\gamma_{11} + y_2\gamma_{21} + \ldots + y_g\gamma_{g1} + x_1\beta_{11} + x_2\beta_{21} + \ldots + x_k\beta_{k1} = \epsilon_1$$
$$y_1\gamma_{11} + y_2\gamma_{22} + \ldots + y_g\gamma_{g2} + x_1\beta_{12} + x_2\beta_{22} + \ldots + x_k\beta_{k2} = \epsilon_2$$
$$\vdots$$
$$y_1\gamma_{11g} y_2\gamma_{2g} + \ldots + y_g\gamma_{gg} + x_1\beta_{1g} + x_2\beta_{2g} + \ldots + x_k\beta_{kg} = \epsilon_g$$

where $\epsilon_1, \epsilon_2, \ldots, \epsilon_g$, are g stochastic disturbance terms (random variables), the y's are coefficients of endogenous variables, and the $\beta$'s are coefficients of predetermined variables.

Each institution of higher learning has a "personality." This personality is the result of many factors among which are its tradition, location, intellectual orientation, student selection policies, extra-curricular activities and reputation. This personality has a number of implications. For one, students apply to schools with which they perceive themselves to be of like mind. Nevertheless, perception is not reality. Not all students that are accepted to an institution finish or do well at that institution. This might be due to inadequate educational preparation in high school (SAT scores are not determinative; they only measure a few competencies), or because the student does not fit into the social environment in the institution. A study of an institution's past and present student population should disclose the characteristics that best points to the likelihood that a student would successfully complete his/her selected educational program at a particular institution. The method according to the invention preferably separates and classifies applicants into two different groups, those who will likely make it and those that probably will not.

The mathematical representation of the classifying methodology for classifying members of a total population into two populations $\pi_1, \pi_2$, representing those who will fall into regions $R_1, R_2$ which in turn represent failure and success, and which together make up total region $\Omega$, is:

The conditional probability, $P(2|1)$, of classifying an object as $\pi_2$ when, in fact, it is from $\pi_1$ is $$P(2|1) = P(X \in R_2|\pi 1) = \int_{R_2 = \Omega - R_1} f_1(x)dx$$

Similarly, the conditional probability, $P(1|2)$, of classifying an object as $\pi_1$ when it is really from $\pi_2$ is $$P(1|2) = P(X \in R_1|\pi 2) = \int_{R_1} f_2(x)dx$$

where the calculations are performed in a two-dimensional space defined by axes $x_1, x_2$, representing student profile and course of study.

The average or expected cost of misclassification (ECM) is provided by:

$$ECM = c(2|1)P(2|1)p_1 + c(1|2)P(1|2)p_2$$

The preferred classification rule should have an ECM that is as small, or as nearly small, as possible.

The regions $R_1$ and $R_2$ that minimize the ECM are defined by the values x for which the following inequalities hold:

$$R_1: \frac{f_1(x)}{f_2(x)} \geq \left( \frac{c(1|2)}{c(2|1)} \right) \left( \frac{p_2}{p_1} \right)$$

$$\left( \begin{array}{c} \text{density} \\ \text{ratio} \end{array} \right) \geq \left( \begin{array}{c} \text{cost} \\ \text{ratio} \end{array} \right) \left( \begin{array}{c} \text{prior} \\ \text{probability} \\ \text{ratio} \end{array} \right)$$

$$R_2: \frac{f_1(x)}{f_2(x)} < \left( \frac{c(1|2)}{c(2|1)} \right) \left( \frac{p_2}{p_1} \right)$$

$$\left( \begin{array}{c} \text{density} \\ \text{ratio} \end{array} \right) < \left( \begin{array}{c} \text{cost} \\ \text{ratio} \end{array} \right) \left( \begin{array}{c} \text{prior} \\ \text{probability} \\ \text{ratio} \end{array} \right)$$

Further, assuming the joint densities of $X' = X_1, X_2, \ldots, X_p]$ for populations $\pi_1$ and $\pi_2$ are given by $$f_i(x) = \frac{1}{(2\pi)^{p/2}|\Sigma|^{1/2}} \exp\left[ -\frac{1}{2} (x-\mu_i)'\Sigma^{-1}(x-\mu_i) \right],$$

for $i = 1,2$

Supposing that the population parameters $\mu_1, \mu_2$, and $\Sigma$ are known, there after cancellation of the terms $(2\pi)^{p/2}|\Sigma|^{1/2}$, the minimum ECM regions become:

$$R_1: \exp\left[ -\frac{1}{2}(x-\mu_1)'\Sigma^{-1}(x-\mu_1) + \frac{1}{2}(x-\mu_2)'\Sigma^{-1}(x-\mu_2) \right] \geq \left( \frac{c(1|2)}{c(2|1)} \right) \left( \frac{p_2}{p_1} \right)$$

$$R_2: \exp\left[ -\frac{1}{2}(x-\mu_1)'\Sigma^{-1}(x-\mu_1) + \frac{1}{2}(x-\mu_2)'\Sigma^{-1}(x-\mu_2) \right] < \left( \frac{c(1|2)}{c(2|1)} \right) \left( \frac{p_2}{p_1} \right)$$

Given the regions $R_1$ and $R_2$ above, one can construct the following classification rule:

Let the populations $\pi_1$, and $\pi_2$ be described by multivariate normal densities. The allocation rule that minimizes the ECM is given by:

$$(\mu_1 - \mu_2)'\Sigma^{-1}x_o - \frac{1}{2}(\mu_1 - \mu_2)'\Sigma^{-1}(\mu_2) \geq \ln\left[\left(\frac{c(1|2)}{c(2|1)}\right)\left(\frac{p_2}{p_1}\right)\right]$$

In a preferred embodiment of the present invention, a central processing unit can be used for implementing and administering the unit investment trust education investment plan. Preferably, it is initially used to select the participant student-investees from among the applicants, and to compile the necessary information to generate the unit investment trust offering documents which prospective investors or shareholders use in making a decision on whether or not to invest in the unit investment trust of the present invention. The offering documents would normally describe the risk and return characteristics of the unit investment trust and include disclosures of information concerning, for example, the expected number of students in whose educations the unit investment trust is expected to invest, expected student-investee future earnings flow, expected periodic payments to education institutions to be attended by student-investees, career paths chosen by student-investees and historical earnings data related as nearly as possible to the student-investee career paths.

In addition to the projections described above, primary calculations preferably performed by the central processing unit in generating the offering documents include: (1) estimating the total necessary transfer of student earnings from the students to the unit investment trust so as to enable the investors to earn a market return on their investment and (2) calculating the percentage of typical student-investee gross earnings to be transferred to the unit investment trust upon securing employment.

For example, for a unit investment trust which finances $N_s$ students pursuing careers in a particular discipline, wherein the average cost for educating student i totals $C_i$ investor dollars at the closing of the sale of the unit investment trust, the following equation can be used by the central processing unit to model the unit investment trust:

$$\sum_{i=1}^{Ns} \sum_{j=1}^{\text{All periods}} \frac{E_{ij} - A_j}{(1+r)^n} = \sum_{i=1}^{Ns} C_i + S$$

wherein: $E_{ij}$ is the expected portion of student i's annual earnings for period j to be transferred to the unit investment trust; $A_j$ is the administrative cost of the unit investment trust for period j; $1/(1+r)^n$ is the discounting function for period n at rate r; S is the selling and underwriting expenses relating to the initial offering of the unit investment trust. In the above equation, $\Sigma_{i=1}^{Ns} c_i$ represents the total cost for educating the $N_s$ students. The inside summation above (over j) is performed for each period j over which student transfers earnings to the unit investment trust (e.g., each quarter for a period of 15 years). The outside summation above (over i) is performed for each student (e.g., i=1, 2, 3, ..., $N_s$). Thus, for an estimated return r, estimated administrative costs $A_j$ and estimated selling and underwriting expenses S, the necessary student-investee transfer of earnings to the unit investment trust $E_{ij}$ can be calculated through an iterative process.

In accordance with the present invention, after estimating the necessary student-investee transfer of earnings to the unit investment trust $E_{ij}$ to earn a predetermined return r, the central processing unit preferably estimates the percentage $P_i$ of student-investee gross earnings for period j, (i.e., $I_{ij}$) to be transferred to the unit investment trust upon securing employment (i.e., transfer=$I_{ij}*P_i$).

Thus, in accordance with the present invention, one of the purposes of the central processing unit is to perform the necessary calculations in order to allow the unit investment trust to finance student-investee education while enabling investors to earn a reasonable return on their investments.

After the central processing unit performs the necessary calculations to generate risk and return characteristics and other information for the offering documents, the processing unit preferably also keeps track of the investors or shareholders who invest in the unit investment trust. Upon the closing of the sale of the unit investment trust, the central processing unit is preferably used to compile information regarding student applicants for the education investment plan and to assist in the selection of students who meet the necessary requirements for acceptance into the plan as discussed above, selecting a predetermined number of student-investees for participation in the education investment plan.

After the unit investment trust is formed and student-investees have been selected for the education plan, those students typically would enter into a contract with the unit investment trust to outline the rights and obligations between the student-investees and the unit investment trust. Such a contract would preferably include language outlining terms and conditions of the unit investment trust's obligation to provide funding to cover tuition and other expenses of the student-investee. The contract would also preferably include language outlining the student-investee's obligation to transfer to the unit investment trust a predetermined portion of the student-investee's future employment earnings.

The predetermined portion would preferably be expressed as a predetermined percentage (preferably between about 5% and about 25%) and a predetermined number of monthly payments calculated on the basis of a payback period of between about five years and about twenty-five years, preferably about fifteen years.

After entering into a contract including provisions similar to those above, the student-investee is educated, at the expense of the unit investment trust, in exchange for a promise by the student to transfer to the unit investment trust, future employment earnings. However, in contrast to a conventional student loan wherein the student pays back the lender a fixed principal at a particular interest rate, the student-investee described herein pays the unit investment trust a predetermined portion of his/her earnings. As stated above, the obligation of payment would run for a predetermined number of payments based on an assumed payback period between about five years and about twenty-five years, preferably about fifteen years. However, the obligation would be expressed in terms of a number of monthly payments between about sixty payments and about 300 payments, preferably about 180 payments. Because payments are required only in months in which the student-investee has sufficient income, the obligation can run for more months than the number of payments required, depending on the particular student-investee's employment situation.

A plan for funding higher education in accordance with the present invention has many advantages.

First, for those students who do not initially have large salaries upon graduation, obligations for education financing can be a smaller burden, in comparison to student loans, because the payment schedule is tied to a fixed percentage of the student's earnings. Thus, the likelihood of failing to meet education-related financial obligations may be reduced.

Second, for the education funding plan described herein, a student who may otherwise have been unable to obtain enough funds to cover a complete education may be able to do so under appropriate circumstances.

Third, if a particular sector of industry or government would like to promote the education of students in particular fields of study, that sector can invest in a unit investment trust to provide funding specifically to promote those fields of study. Moreover, to the extent that society valued certain professions, those professions would generate higher salaries. That would enable the unit investment trust to charge a lower interest factor to student-investees who intend to enter those fields, which in turn would result in more student-investees favoring those fields.

Fourth, to the extent that certain educational institutions provided higher quality education, their graduates would earn higher salaries which, again, would enable the unit investment trust to charge a lower interest factor. Ultimately, this preference for those attending particular institutions would result in more students applying to those institutions, while fewer students would apply to institutions where the cost of funding is higher. This would give an economic incentive for institutions to improve the quality of their educational product.

Thus, in accordance with the present invention, the administration and implementation of a unit investment trust education investment plan provides benefits to students, investors and society/industry as a whole.

A particular benefit to the investor is that return on investment tracks the student's salary to provide a means for hedging on inflation. For example, if student salaries increase due to inflation, investor return tracks such increase (in addition to normal experience/training-related increases). Thus, the unit investment trust of the present investment provides an investment vehicle which is less susceptible to investment risks associated with unpredictable inflation.

With the foregoing overview in mind, the detailed operation of the system can best be understood by reference to FIGS. 1 through 7 which illustrate the system in the context of the financing of higher education.

In FIG. 1, which shows a first preferred embodiment of apparatus according to the invention, system 10 includes a computer 11 comprising a central processing unit ("CPU") 20, a working memory 22 which may be, e.g., RAM (random-access memory) or "core" memory, mass storage memory 24 (such as one or more disk drives or CD-ROM drives), one or more cathode-ray tube ("CRT") display terminals 26, one or more keyboards 28, one or more input lines 30, and one or more output lines 40, all of which are interconnected by a conventional bidirectional system bus 50.

Input hardware 36, coupled to computer 11 by input lines 30, may be implemented in a variety of ways. Economic data, such as the employment prospects and available salaries in different industries, may be inputted via the use of a modem or modems 32 connected by a telephone line or dedicated data line 34 to an online financial service. Alternatively or additionally, the input hardware 36 may comprise CD-ROM drives or disk drives 24. In conjunction with display terminal 26, keyboard 28 may also be used as an input device, particularly for student applications, as well as for investor data when new investors are added.

Output hardware 46, coupled to computer 11 by output lines 40, may similarly be implemented by conventional devices. By way of example, output hardware 46 may include CRT display terminal 26 for displaying, inter alia, the list of accepted students, money owed by students, or money owed to investors. Output hardware might also include a printer 42, so that hard copy output may be produced, or a disk drive 24, to store system output for later use.

In operation, CPU 20 coordinates the use of the various input and output devices 36, 46, coordinates data accesses from mass storage 24 and accesses to and from working memory 22, and determines the sequence of data processing steps. Specific references to components of the hardware system 10 are included as appropriate throughout the following description of the processing steps carried out by the hardware system.

Figure 2:
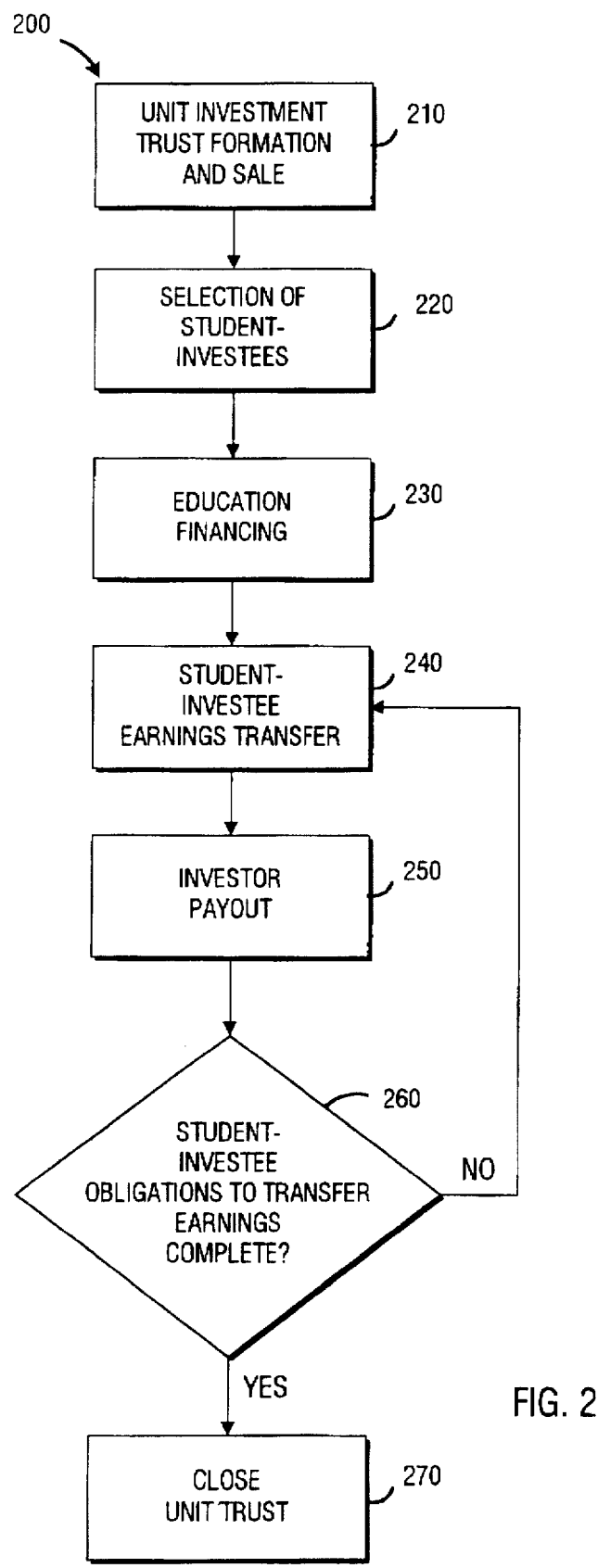
FIG. 2 is flowchart representing a preferred embodiment of the data processing method according to the invention.

FIG. 2 shows one preferred embodiment of the method 200 according to the present invention, particularly as it might be implemented by apparatus 10. At step 210, the system according to the invention processes the formation of a unit investment trust and its sale to a plurality of investors or shareholders to generate a pool of funds for education. Next, the system proceeds to step 220, where the system selects a plurality of student-investees to participate in the investment education plan and processes their entry into an agreement with the unit investment trust. At step 230, the system processes the financing by the unit investment trust of the education of the selected student-investees, including administering the disbursement of the financial resources for the student-investees to attend the college or university identified in their agreements with the unit investment trust. Next, at step 240, the system processes the transfer by the student-investees to the unit investment trust, upon graduation from their educational institutions and securing employment, of a predetermined percentage of their earnings. At step 250, the system arranges, upon receipt by the unit investment trust of student-investee earnings, the payout to the investors or shareholders. At test 260, the system determines if all student-investee obligations to transfer earnings to the unit investment trust are complete. If not, the system returns to step 240 where the above steps are repeated. If at test 260 the obligations of all student-investees to transfer earnings is complete, the system continues to step 270 where the trust is closed.

Figure 3:
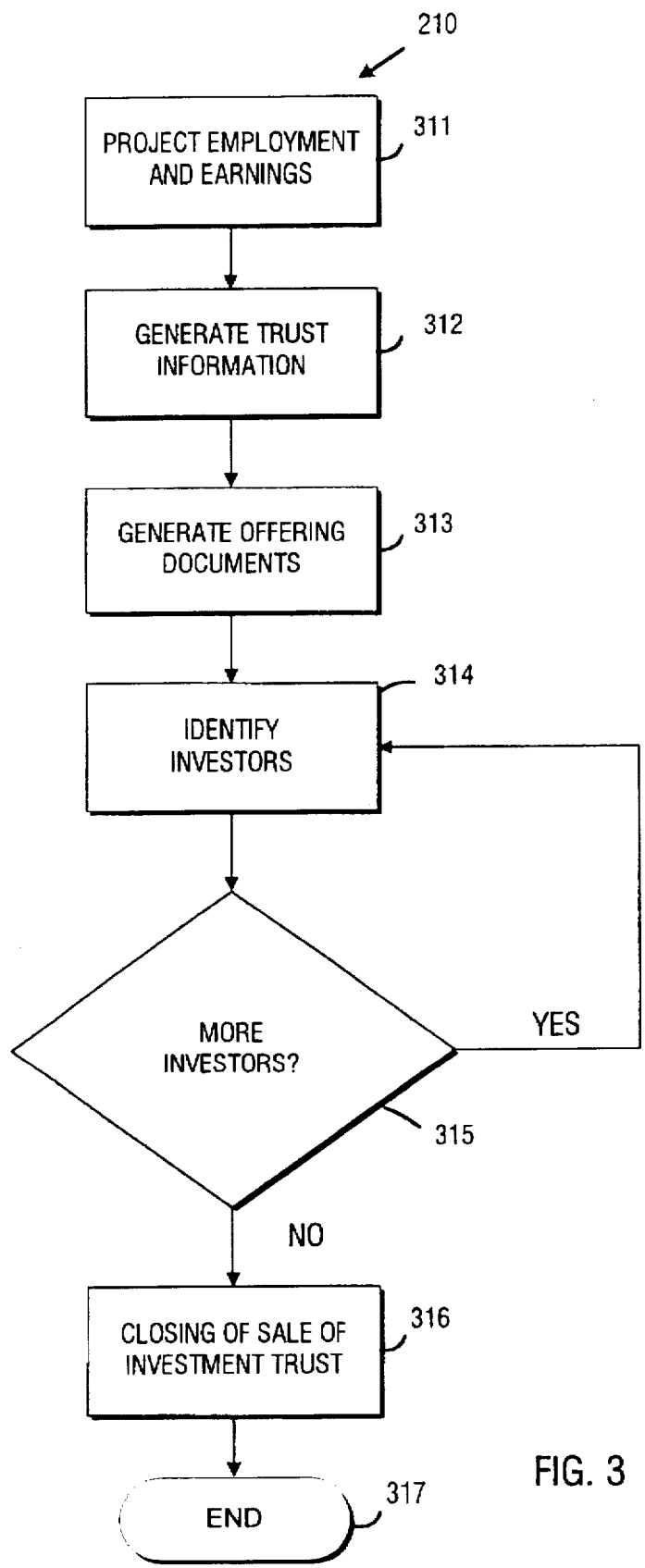
FIG. 3 is a flowchart representing in more detail the preferred embodiment of the unit investment trust formation and sale operation step of the method of FIG. 2.
Figure 4:
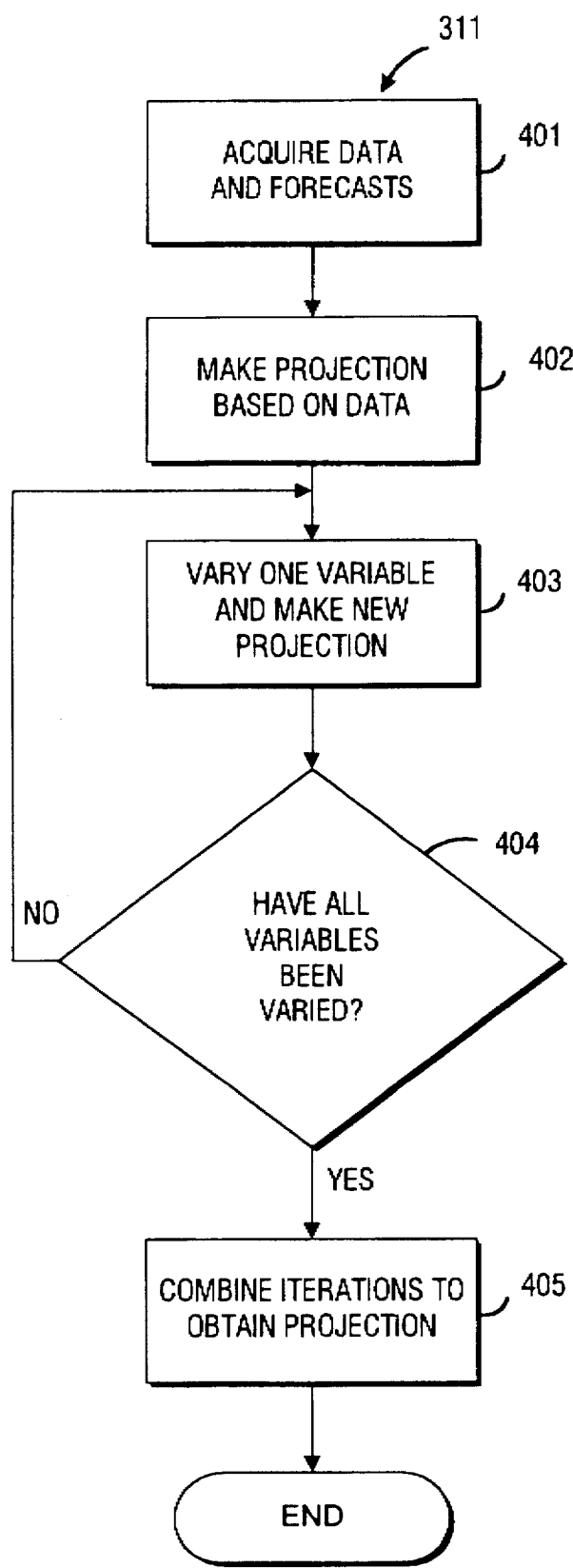
FIG. 4 is a flowchart representing in more detail the preferred embodiment of the employment and earning projection step of the method of FIG. 3.

FIG. 3 shows a preferred embodiment of a software routine for an implementation according to the present invention of the unit investment trust formation and sale operation step 210 of FIG. 2. As shown in FIG. 3, step 311 includes projecting employment and earning opportunities for existing and potential student-investees upon completion of their educations funded by the unit investment trust. Such projections, illustrated in more detail in the flowchart of FIG. 4, include acquiring at step 401 governmental and private sector produced data and forecasts relating to demographics, economics, employment and technology, either over line 34 via modem 32 from an online service, or in the form of a disk or CD-ROM that can be read by drive 24. Certain data that are not available in electronic form may also be entered manually via keyboard 28. At step 402, the data, discussed above, including data relating to predictions of incomes for different fields, likely rates of salary growth, likely periods of unemployment, drop-out rates by field, number of graduates who go on for further education, average number of years of further education pursued, etc., are evaluated and integrated into a projection of labor demands and compensation for a particular occupation and a given future time interval.

One method of carrying out the projection according to the invention is to solve the statistical equations set forth above. Another method, illustrated in FIG. 4 and particularly well-suited to digital computers, is to carry out the projection using a given set of values for the variables (e.g., the median value for each variable), and then to carry out the projection iteratively, varying one variable at a time. At step 403, a variable is changed and the projection is iterated.

Next, at test 404, the system determines whether or not all variables have been varied. If not, the system returns to step 403 where a different variable is varied. If at test 404 it is determined that all variables have been varied, the system proceeds to step 405 where the results of the various iterations are combined by a suitable technique (mean, median, least-squares regression, etc.) to yield a reliable projection, and routine 311 ends.

Next, returning to FIG. 3, at step 312, information necessary to form the unit investment trust is generated. Step 312 includes establishing, prior to selecting students to participate in the unit investment trust education plan, criteria for acceptance into the plan and forming a database containing such acceptance criteria including, for example, minimum prior academic performance, standardized test results and other recognized indicia used in college acceptance and those related to career success. These criteria and their use are discussed in more detail with reference to FIG. 5, below. Also as part of step 312, after establishment of criteria for acceptance into the education plan, a board of trustees and operating officers are appointed to the trust. Money managers and fiduciaries can also be selected. Trust documents are then produced as part of step 312.

The system then proceeds to step 313, which includes generating the offering documents which are used by investors to evaluate risk and potential return from the investment and to make a decision as to whether or not to invest in the unit investment trust. In order to generate the offering documents, including any prospectus or private placement memorandum, the following steps preferably are performed. First, data regarding expected education plan characteristics are gathered. Such data include, for example, the expected number of students in the plan, typical future earning flows associated with such students and related assumptions including projected investor rate of return, expected periodic payments to the institutions which the students will be attending, career paths chosen by the students, estimated student drop-out rates from their educational program, mortality rates, rates of default and late payment by students after securing employment, and historical earnings data related as nearly as possible to career paths and student profiles. Student-investee transfers of earnings to the unit investment trust (i.e., the student earnings "purchased" by the unit investment trust) needed to earn a market rate of return for the investors are also calculated, as discussed above. The percentage of typical graduate gross earnings to be paid to the plan are then calculated, as discussed above. The above data are used to print the offering documents.

The system then proceeds to step 314 wherein the offering documents are used by investors to make a decision as to whether or not to invest in the investment trust. Those who decide to invest are entered into the system, preferably through keyboard 28. Next, at test 315, the system determines whether more investors are needed to generate the required pool of funds for the unit investment trust. If so, the system returns to step 314 where the aforementioned steps are repeated. If at test 315 the system determines that no additional investors are needed, the system proceeds to step 316 where the sale of the unit investment trust is closed.

The closing of sale of the unit investment trust at step 316, can include the following steps. A bank account for net proceeds of the sale and related record keeping for the trust may be established. Funds are disbursed to the money manager. A registrar and transfer agent for trust certificates may then be appointed. Closing documents may also be prepared during this step. Issuance of evidence of ownership to investors may then be authorized. Upon closing of the sale of the unit investment trust the routine ends at 317.

Figure 5:
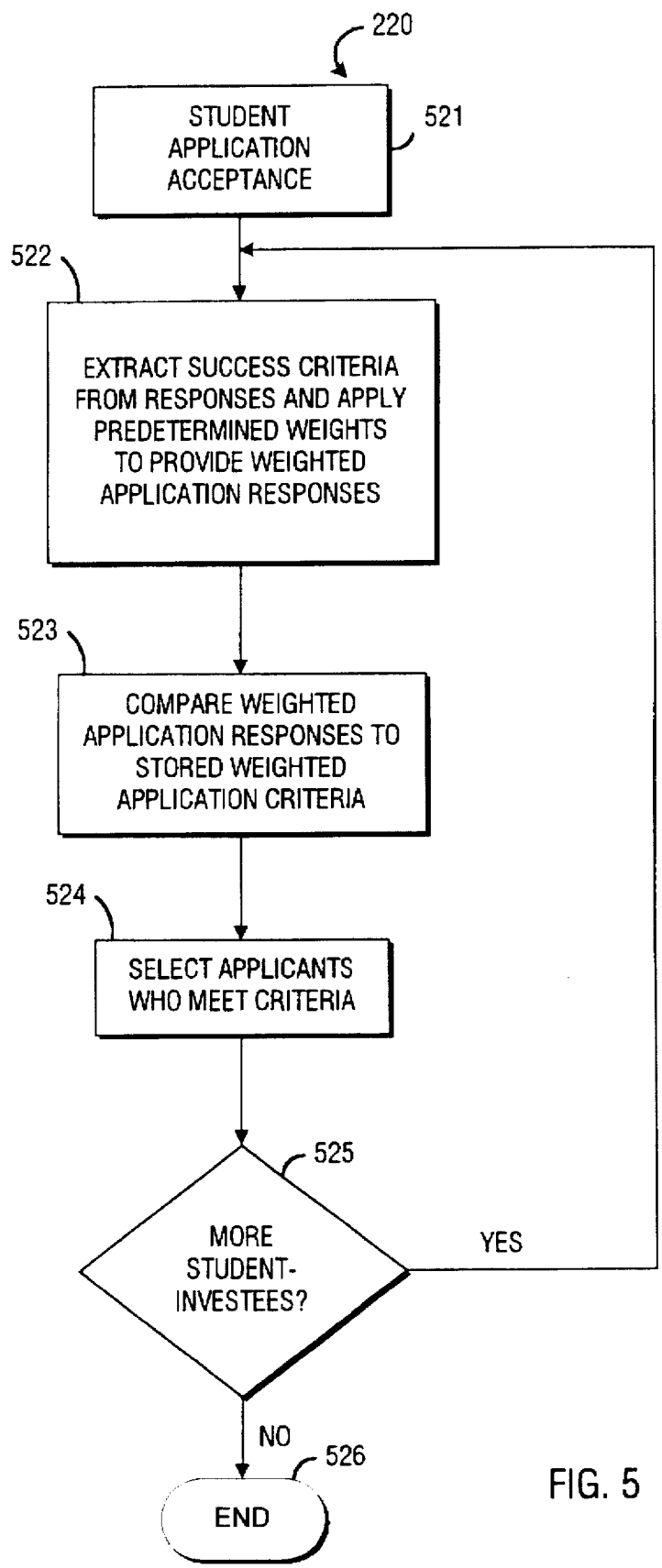
FIG. 5 is a flowchart representing in more detail a preferred embodiment of the student-investee selection step of the method of FIG. 2.

After trust formation and sale, the process proceeds to step 220 where student-investees are selected for participation in the education plan of the investment trust. A preferred embodiment of a software routine to implement step 220 is shown in FIG. 5.

At step 521, student applications are accepted for evaluation. This step includes establishing a data base file of student applications and determining if application requirements have been satisfied. For example, the following inquiries may be made: 1) Is the application complete?; 2) Has the application fee been paid?; 3) Has a transcript of the student's prior academic record been submitted?; 4) Have the results of standardized tests been submitted?.

The process then continues to step 522 where each student-investee's various application responses with respect to success criteria as discussed above are extracted from the application data and weighted in accordance with the criterion weights discussed above, which preferably are stored in disk drive 24, to form weighted application responses, which also may be stored. Next, at step 523, the weighted application responses are compared to previously determined and stored weighted application criteria. At step 524, those applicants whose score computed from weighted application responses, as discussed above, exceed the weighted application criteria are selected into the unit investment trust education plan. Selected students' names and addresses preferably are stored in a database in mass storage memory 24 of system 10, and, if desired, can be encrypted for security purposes.

The system then proceeds to test 525 where it is determined whether or not more students are needed to fill the number of available openings in the education investment plan. If so, the system returns to step 522 and the process repeats. If at test 525 no additional students are needed, the routine ends at 526.

Although steps 210 and 220 were discussed above as occurring sequentially—i.e., trust formation and sale occurred before selection of student-investees, this does not have to be the case. For example, in alternate preferred embodiments of the present invention, selection of student-investees for the unit investment trust can take place before trust formation and sale or, if desired, the selection and formation/sale steps can proceed simultaneously.

Figure 6:
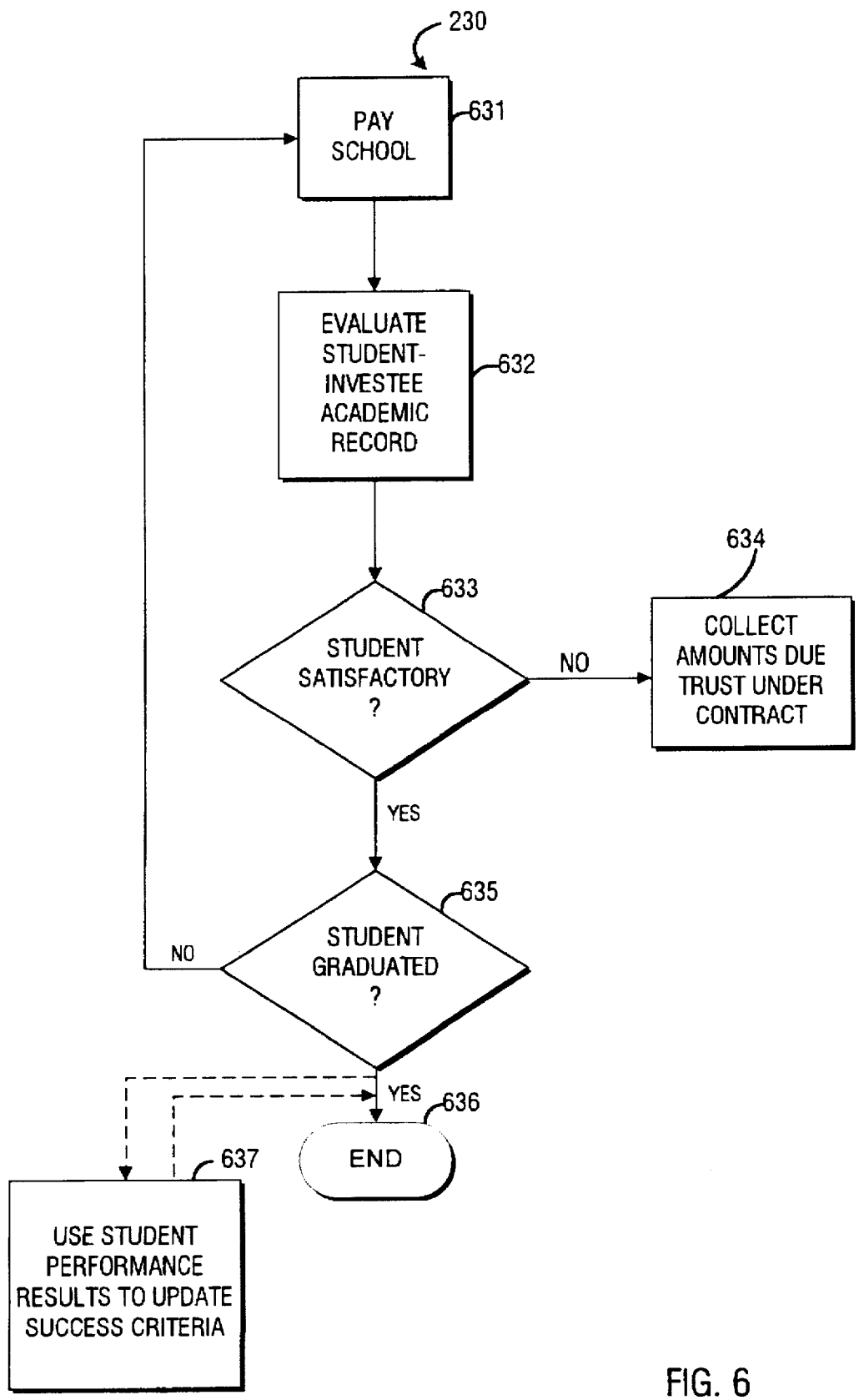
FIG. 6 is a flowchart representing in more detail a preferred embodiment of the education financing step of the method of FIG. 2.

After the unit investment trust is formed and sold, and student-investees are selected for placement into the education investment plan, the system continues to step 230 wherein the selected students' educations are financed by the investment trust while the student-investees successfully complete their educational programs. FIG. 6 shows a software routine for implementing the education financing step 230 of FIG. 1 in more detail. At step 631, the unit investment trust forwards a check, on behalf of the student, to the student's university or college. Preferably, the check is intended to cover one term of the student's education, e.g., a semester or quarter, depending upon the educational institution.

At step 632, the student's academic record at the end of the term is evaluated by the unit investment trust managers. At test 633, it is determined whether or not the student's academic record is satisfactory for continued participation in the plan (e.g., whether or not a minimum grade point average has been achieved or whether or not minimum course load requirements have been fulfilled). If not, the system continues to step 634 where the unit investment trust proceeds to collect from the student amounts due under the student's contract with the investment trust (e.g., amount due on default) and the student's participation in the education plan is severed. If at test 633 the student's academic record is determined to be satisfactory, the system continues to test 635 where it is determined whether or not the student has completed all necessary course requirements for graduation. If not, which implies that the student has additional course requirements to complete at his or her college or university, the system returns to step 631 where the above steps are repeated for another term. If at test 635 it is determined that the student has completed all necessary course requirements to graduate, the routine ends at 636. Optionally, before the routine ends, the system may proceed to step 637 where data gathered in monitoring the progress of one or more students is fed back to the stored success criteria so that they can be updated based on additional experience.

Figure 7:
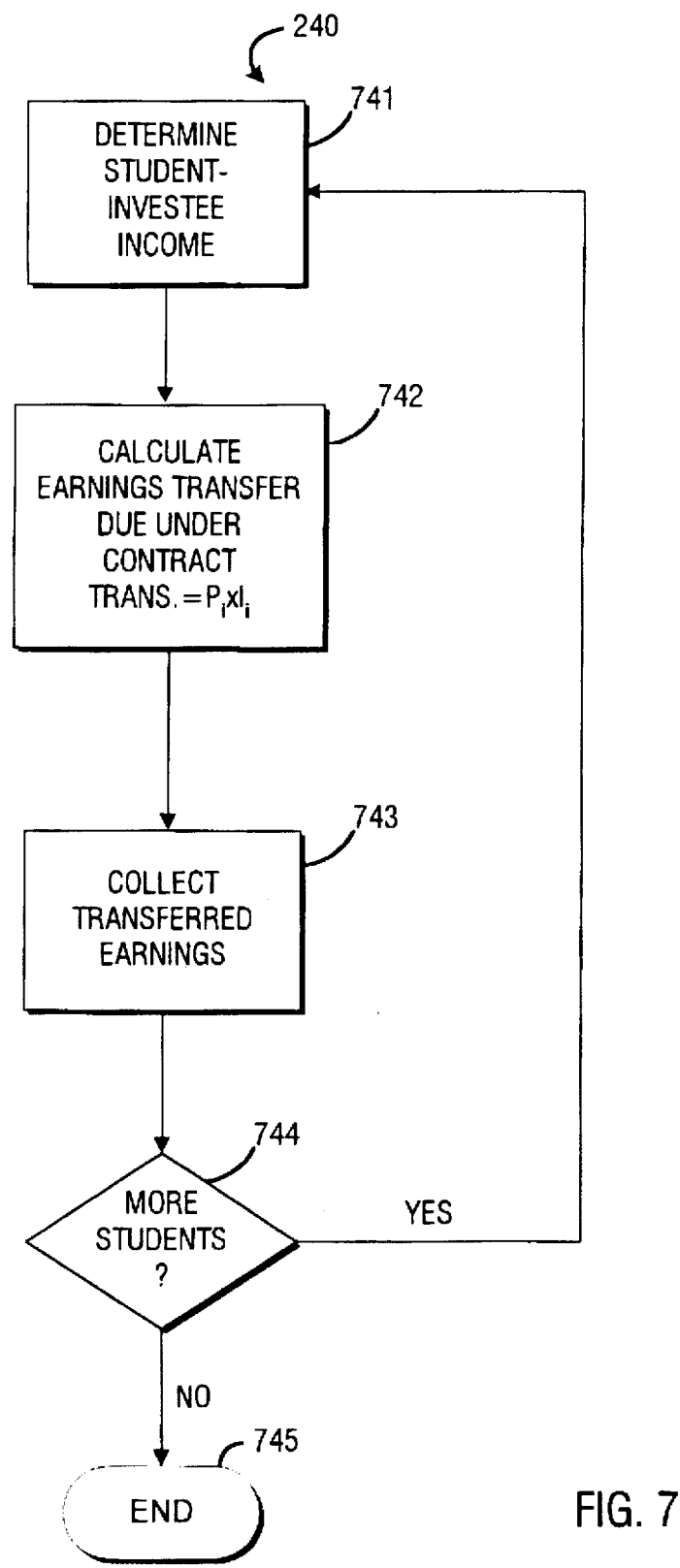
FIG. 7 is a flowchart representing in more detail a preferred embodiment of the student-investee earnings transfer step of the method of FIG. 2.

After the student's education has been financed and the student has completed all necessary course requirements for graduation, the student begins employment and the system continues to step 240 where student-investee earnings are transferred to the unit investment trust. FIG. 7 shows a software routine for implementing the student-investee earnings transfer step 240. The routine begins at step 741 by determining the student-investee's income. That determination is based on a report by the student, which at the end of the year preferably is verified or confirmed by the student's income tax returns or related documents which record earnings. At step 742, the system calculates the earnings transfer due under contract. For example, for a particular student i the transferred earnings is equal to that particular student's income, $I_i$, multiplied by the percentage, $P_i$, specified in the student-investee's contract with the investment trust (i.e., Transfer=$P_i * I_i$). The system then continues to step 743 where transferred earnings are collected by the unit investment trust. Preferably, earnings transfer to the unit investment trust is by deduction from paychecks received from the student-investee's employer (subject to agreement of such employer), and/or in the case of self-employment income or where the student-investee's employer does not agree to payroll deduction, by monthly payments directly by the student-investee to the investment trust.

The system then continues to test 744 where it determines whether or not more students are obligated to transfer earnings. If so, the system continues to step 741 where the above steps are repeated. If at test 744 no additional students are obligated to transfer earnings, the routine ends at 745.

If desired, the contract between the student and the investment trust could include provisions for limiting the cumulative amount of earnings a particular student transfers to the investment trust (e.g., two-and-a-half times the amount the investment trust invested in the student's educational program). Additionally, the contract could also include provisions for allowing a particular student to buy back from the investment trust the rights to the student's future earnings. Of course, a wide variety of other similar provisions could be included in a contract to alter the obligation of the student to transfer a fixed percentage of future earnings.

Figure 8:
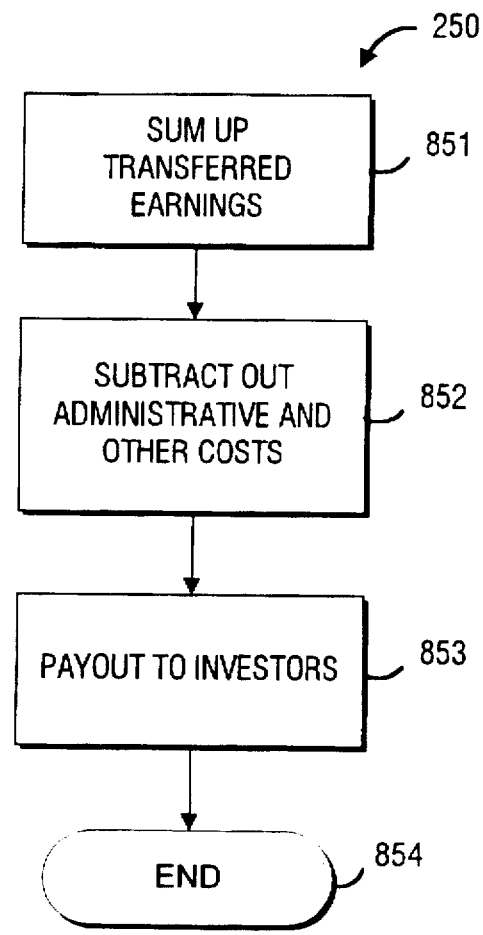
FIG. 8 is a flowchart representing in more detail a preferred embodiment of the investor payout step of the method of FIG. 2.

After the student-investee transfers a predetermined percentage of his or her income to the investment trust, the system continues to step 250 wherein the plurality of investors are paid. FIG. 8 shows a software routine for implementing the investor payout step 250.

The routine begins at step 851 where individual student-investee transferred earnings are added together to form a total amount of available funds for partitioning out to the investors in the investment trust. The system then continues to step 852 wherein administrative and other costs are subtracted from the total amount of transferred earnings collected from the individual student-investees. At step 853, the investors are paid with the remaining funds in proportion to the number of shares they hold in the unit investment trust. The routine then ends at 854.

Preferably, steps 240 and 250 are repeated at periodic intervals of time, for example, monthly or quarterly. For each such interval, student-investees would transfer to the investment trust a fixed percentage of their earnings for the period (e.g., a percentage in the range from about 5% to about 25%) and the administrators of the unit investment trust would subtract administrative and other costs for the period from those funds and, with the remainder, pay the investors. If desired, in between investor payout intervals, the unit investment trust can re-invest surplus funds in short term low-risk investments to maximize unit investment trust shareholder return.

Referring back to FIG. 2, after step 250, the system continues to test 260 where a determination is made as to whether or not student-investee obligations to transfer earnings are discharged—for example, whether each student-investee has transferred earnings to the unit investment trust for all of the time periods specified in their investment trust contracts. Preferably, particular time periods will add (as discussed above) to between about five years and about twenty-five years. If the obligations are not discharged, the system continues to step 240 and the aforementioned steps are repeated. If at test 260 the obligations have been discharged, the system continues to step 270 where the unit investment trust is closed.

Figure 9:
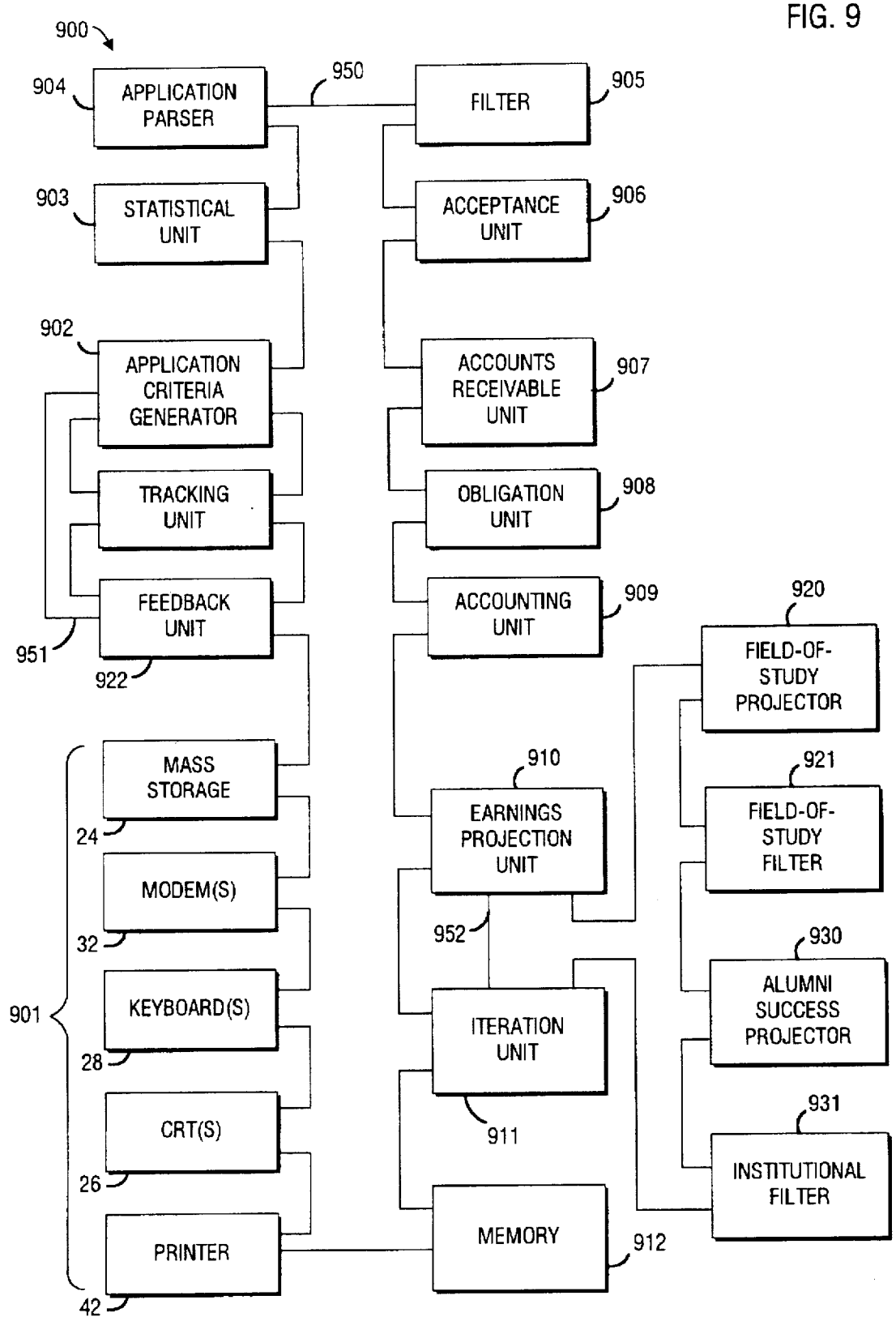
FIG. 9 is an illustration of a second preferred embodiment of a hardware system according to the present invention.

In FIG. 9, which shows a second preferred embodiment of apparatus according to the invention, hardware combination 900 replaces CPU 20 for many of the functions performed by process 200. Although a CPU of some kind will still be used for many of the bookkeeping operations of the system (billing, collection, etc.), in the embodiment of FIG. 9 many of the functions are carried out by special purpose hardware. Although some or all of the dedicated hardware modules could be implemented as single-program general purpose microprocessors, they may also be implemented as hard-wired logic (such as appropriately hard-wired gate arrays). As still another alternative, this hardware combination 900 could be implemented by a programmable logic device ("PLD"), such as the FLEX 8000™ PLD manufactured by Altera Corporation, of San Jose, Calif., coupled to an erasable programmable read-only memory ("EPROM"). One advantage to using a PLD-based hardware system would be the ability to dynamically reconfigure the hardware components.

Apparatus 900 is built around a communications bus 950 similar to bus 50 of FIG. 1. Although not shown in FIG. 9, a CPU similar to CPU 20 may also be included in apparatus 900, connected to bus 950. Apparatus 900 also includes input/output devices 901 similar to those in system 10, including one or more mass storage devices 24, one or more CRTs 26, one or more keyboards 28, one or more modems 32, and one or more printers 42.

An application criteria generator 902 preferably is provided for creating at least one set of application criteria for acceptance of students into the plan. Application criteria generator 902 most likely would function in conjunction with manual input at keyboard 28. Connected to application criteria generator 902, preferably by local bus 951 as well as by bus 950, are preferably a tracking unit 912 and a feedback unit 922 for tracking student progress and using the tracking results to update and refine the application criteria and their weights.

A statistical unit 903 may be provided to assign relative weights to the application criteria to provide weighted application criteria. Statistical unit 903 is thus preferably capable of performing the regression analysis referred to above, and for that purpose could be a hard-wired device, a dedicated processor or a programmed PLD.

An application parser 904 collects and stores application responses from each of the student applicants relative to the application criteria, and retrieves criterion weights that are preferably stored in mass storage 24 and weights the application responses according thereto. This unit also could be a microprocessor, hard-wired logic or a PLD, and would function in conjunction with input of the application data, which could be manual, or could use optical scanning or similar technology (not shown).

A filter 905 has a first input connected to statistical unit 903 for applying the weighted application criteria to filter 905, and a second input connected to application parser 904 for applying the weighted application responses to filter 905. Filter 905 compares the weighted application responses to the weighted application criteria, and for that purpose could be a simple comparator, or it could use a more complex filtering technique.

An acceptance unit 906 is responsive to filter 905 for flagging data, in the system working or mass storage memory, representing the student applicants, to indicate that a particular student has been accepted into the plan based on the comparison of the weighted application responses of each respective student to the weighted application criteria.

An accounts receivable unit 907 records the deposit by investors of sufficient funds to fund at least a portion of said education of each of the accepted students. While heretofore the discussion has assumed that the plan administered by the method and system of the invention would pay for all of a student's expenses each term, it is within the invention for the plan to cover only a portion of those expenses (in return, e.g., for a smaller percentage of future earnings).

An obligation unit 908 generates a document to be executed by each student to reflect that the unit investment trust has purchased an amount of student earnings on behalf of the investors, the purchased earnings comprising a predetermined percentage of earnings of each respective accepted student for a respective predetermined time period.

An accounting unit 909 determines what portion of the purchased earnings that have been received from students will be paid to the investors after subtracting administrative and other costs from total purchased earnings received.

The system may also be provided with an earnings projection unit 910 for projecting plan earnings by projection student-investee earnings as described above. Preferably connected to earnings projection unit 910, preferably by local bus 952 as well as by bus 950, are field-of-study projector 920 and field-of-study filter 921 for limiting students to fields of study with suitable returns, as well as alumni success projector 930 and institutional filter 931 for limiting students to institutions with suitable returns. Also connected to earnings projection unit 910 is iteration unit 911, used as described above. Earnings projection unit 910 can be used to print a prospectus or other offering document on printer 42.

Finally, apparatus 900 preferably includes working memory 913 on bus 950, for use by all elements of apparatus 900, including the CPU (not shown).

Figure 10:
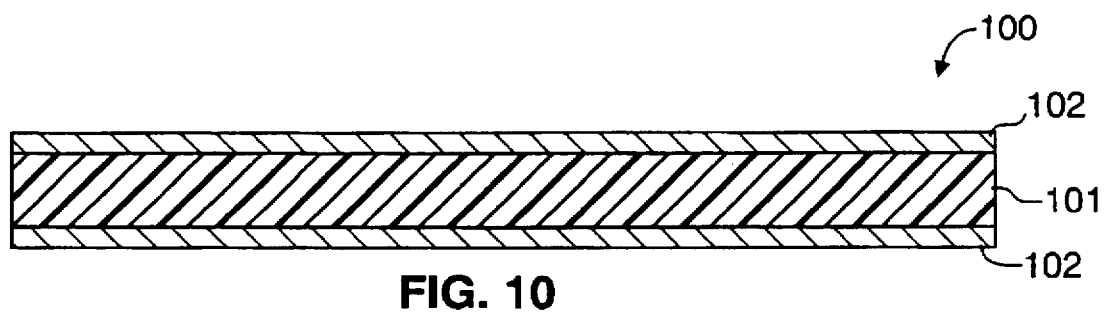
FIG. 10 is a cross-sectional view of a magnetic data storage medium encoded with a set of machine-executable instructions for performing the method of the present invention.

FIG. 10 shows a cross section of a magnetic data storage medium 100 which can be encoded with a machine-executable program, or set of instructions, that can be carried out by a system such as system 10 of FIG. 1. Medium 100 can be a conventional floppy diskette or hard disk, having a suitable substrate 101, which may be conventional, and a suitable coating 102, which may be conventional, on one or both sides, containing magnetic domains (not visible) whose polarity or orientation can be altered magnetically. Medium 100 may also have an opening (not shown) for receiving the spindle of a disk drive or other data storage device 24.

The magnetic domains of coating 102 of medium 100 are polarized or oriented so as to encode, in manner which may be conventional, a machine-executable program such as that described above in connection with FIGS. 2–8, for execution by a system such as system 10 of FIG. 1.

Figure 11:
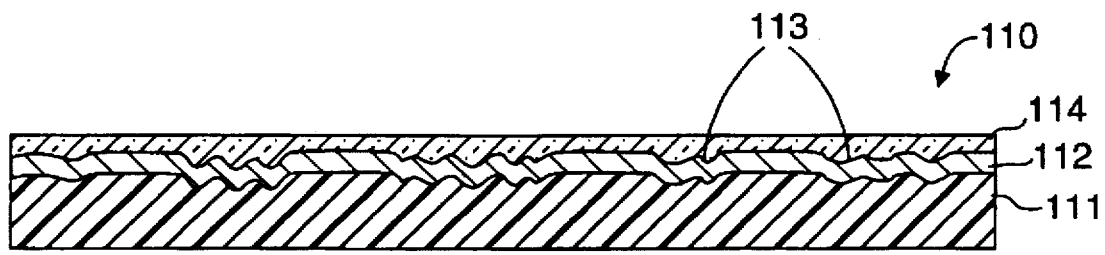
FIG. 11 is a cross-sectional view of an optically readable data storage medium encoded with a set of machine-executable instructions for performing the method of the present invention.

FIG. 11 shows a cross section of an optically-readable data storage medium 110 which also can be encoded with such a machine-executable program, or set of instructions, which can be carried out by a system such as system 10 of FIG. 1. Medium 110 can be a conventional compact disk read only memory (CD-ROM) or a rewritable medium such as a magneto-optical disk which is optically readable and magneto-optically writable. Medium 100 preferably has a suitable substrate 111, which may be conventional, and a suitable coating 112, which may be conventional, usually on one side of substrate 111.

In the case of a CD-ROM, as is well known, coating 112 is reflective and is impressed with a plurality of pits 113 to encode the machine-executable program. The arrangement of pits is read by reflecting laser light off the surface of coating 112. A protective coating 114, which preferably is substantially transparent, is provided on top of coating 112.

In the case of a magneto-optical disk, as is well known, coating 112 has no pits 113, but has a plurality of magnetic domains whose polarity or orientation can be changed magnetically when heated above a certain temperature, as by a laser (not shown). The orientation of the domains can be read by measuring the polarization of laser light reflected from coating 112. The arrangement of the domains encodes the program as described above.

Thus, in accordance with the present invention, a unit investment trust is formed, a particular number of pre-selected students are educated, in pre-selected educational programs, at no substantial initial cost to themselves, and investors earn a return fixed at a predetermined portion of the student-investees' earnings, upon the securing of employment by the students. One skilled in the art will appreciate that the present invention can be practiced by other than the described embodiments, which are presented for purposes of illustration and not of limitation, and the present invention is limited only by the claims which follow.

What is claimed is:

1. A machine-readable data storage medium encoded with a set of machine-executable instructions for carrying out, with a machine capable of executing said instructions, a data processing method for administering a plan for funding education of a plurality of students, each of said students studying in one or more fields of study at one or more educational institutions, said method comprising the steps of:

projecting earnings of said plan by (1) at least one of (a) projecting employment and earnings opportunities for students in said fields of study, and (b) projecting employment and earnings opportunities for graduates of said educational institutions, and (2) at least one of (i) limiting projection of earnings to projections for students in one or more particular fields of study, (ii) limiting projection of earnings to projections for students in one or more particular educational institutions, and (iii) creating at least one set of application criteria for acceptance of students into said plan, said application criteria being for predicting success of individual students in one or more of said fields of study;

reading and storing application responses from each of said students;

accepting students into said plan based at least in part on results of said projecting and reading and storing steps;

processing collection and receipt from investors of sufficient funds to fund at least a portion of said education of each of said accepted students;

automatically generating and printing a document to be executed by each student for purchasing an amount of student earnings on behalf of said investors, said purchased earnings comprising a predetermined percentage of earnings of each respective accepted student; and determining an amount of said purchased earnings to be paid to said investors after subtracting costs from total purchased earnings received from accepted students.

2. The machine-readable data storage medium of claim 1 wherein said encoded instructions for performing said projecting step include encoded instructions for performing said projecting step of creating application criteria, said medium further comprising encoded instructions for:

assigning relative weights to said application criteria to provide weighted application criteria;

deriving criterion weights and weighting said application responses according thereto; and comparing said weighted application responses to said weighted application criteria; wherein:

said step of accepting students, as encoded, is based on said comparison of said weighted application responses of each respective student to said weighted application criteria.

3. The machine-readable data storage medium of claim 2 wherein said acceptance criteria, as encoded, include academic performance criteria and standardized test results criteria.

4. The machine-readable data storage medium of claim 1 wherein said encoded instructions for projecting earnings of said plan include encoded instructions for performing said step of projecting employment and earnings opportunities for students in said fields of study, based on employment histories of said fields and on forecasts of social needs for said fields.

5. The machine-readable date storage medium of claim 1 wherein said encoded instructions for projecting earnings of said plan include encoded instructions for performing said step of projecting employment and earnings opportunities for graduates of said educational institutions, based on past alumni success rates of said educational institutions.

6. The machine-readable data storage medium of claim 1 wherein said encoded instructions for performing said projecting step comprise encoded instructions for:

projecting based on multiple variables; and iteratively projecting said earnings while varying one of said variables per iteration.

7. The machine-readable data storage medium of claim 1 wherein said predetermined percentage, as encoded, is between about 5% and about 25%.

8. The machine-readable data storage medium of claim 1 wherein said purchased earnings, as encoded, comprise said predetermined percentage for a predetermined limited time.

9. The machine-readable data storage medium of claim 8 wherein said predetermined limited time, as encoded, is based on a fixed number of monthly payments.

10. The machine-readable data storage medium of claim 9 wherein, as encoded, said monthly payments by a particular student are due only when said particular student has monthly income above a predetermined floor, whereby said particular student's obligation may last for a number of months greater than said number of monthly payments.

11. The machine-readable data storage medium of claim 10 wherein, as encoded, said number of monthly payments is between about 60 and about 300.

12. The machine-readable data storage medium of claim 11 wherein, as encoded, said number of monthly payments is about 150.

13. The machine-readable data storage medium of claim 1 further comprising encoded instructions for generating offering documents, including a prospectus for allowing potential shareholders to evaluate risk and return characteristics of the offering, responsive to said projecting step.

14. The machine-readable data storage medium of claim 1 further comprising encoded instructions for:

tracking educational and earnings performance of said accepted students during their participation in said plan; and adjusting said relative weights of said criteria based on said performance, thereby adjusting future acceptances into said plan.

15. The machine-readable data storage medium of claim 1 wherein, as encoded, said investors are divided into groups, each group of investors investing only in students studying in only one of said plurality of fields of study.

16. The machine-readable data storage medium of claim 1 wherein said encoded instructions for purchasing student earnings include encoded instructions for estimating such earnings according to the following equation:

$$\sum_{i=1}^{Ns} \sum_{j=1}^{\text{All periods}} \frac{E_{ij} - A_j}{(1+r)^n} = \sum_{i=1}^{Ns} C_i + S$$

wherein: $N_s$ represents the predetermined number of students, $C_i$ represents an average cost for educating student i; $E_{ij}$ is the expected portion of student i's annual earnings for period j to be transferred to the investors; $A_j$ is an administrative cost for period j; $1/(1+r)^n$ is a discounting function for period n at rate r; and S is a selling and underwriting expense relating to the initial offering.

17. The machine-readable data storage medium of claim 1 further comprising encoded instructions for calculating for a student a repurchase price for terminating said student's obligation to transfer earnings to the investors.

18. The machine-readable data storage medium of claim 1 further comprising encoded instructions for calculating estimated student default rates, said accepting step being further based on said estimated student default rates.

19. The machine-readable data storage medium of claim 1 further comprising encoded instructions for calculating estimated student drop-out rates, said accepting step being further based on said estimated student drop-out rates.

20. The machine-readable data storage medium of claim 1, said data storage medium being magnetic.

21. The machine-readable magnetic data storage medium of claim 20, said magnetic data storage medium being a floppy diskette.

22. The machine-readable magnetic data medium of claim 20, said magnetic data storage medium being a hard disk.

23. The machine-readable data storage medium of claim 1, said data storage medium being optically readable.

24. The machine-readable optically readable data storage medium of claim 23, said optically readable data storage medium being a CD-ROM.

25. The machine-readable optically readable data storage medium of claim 23, said optically readable data storage medium being a magneto-optical disk.

* * * * *

UNITED STATES PATENT AND TRADEMARK OFFICE
CERTIFICATE OF CORRECTION

PATENT NO. : 5,745,885
DATED : April 28, 1998
INVENTOR(S) : Anthony J. Mottola et al.

It is certified that error appears in the above-identified patent and that said Letters Patent is hereby corrected as shown below:

Column 1,
Line 9, "abandoned" should be -- abandoned, --.

Column 5,
Line 13, "$Z_1$," should be -- $Z_1$ --;
Line 18, "extra curricular" should be -- extracurricular --;
Line 29, "undertaken" should be -- undertaking --;
Line 53, "rank" should be -- ranked --.

Column 7,
Line 23, "$Y_1 \gamma_{1 1g} \gamma_{2g}$" should be -- $Y_1 \gamma_{1g} + Y_2 \gamma_{2g}$ --;
Line 25, "Y's " should be -- $\gamma$'s --;
Line 43, "points" should be -- point --.

Column 8,
Line 3, "$P(X \in R_2 | \pi 1)$" should be -- $P(X \in R_2 | \pi_1)$ --;
Line 8, "$P(X \in R_1 | \pi 2)$" should be -- $P(X \in R_1 | \pi_2)$ --;
Line 65, "$\pi_1$," should be -- $\pi_1$ --.

UNITED STATES PATENT AND TRADEMARK OFFICE
CERTIFICATE OF CORRECTION

PATENT NO.    : 5,745,885
DATED         : April 28, 1998
INVENTOR(S)   : Anthony J. Mottola et al.

It is certified that error appears in the above-identified patent and that said Letters Patent is hereby corrected as shown below:

Column 9,
Before line 1 should be inserted: -- Allocate $x_0$ to $\pi_1$ if --;
Before line 5 should be inserted: -- Allocate $x_0$ to $\pi_2$ otherwise. --.

Column 14,
Line 23, "score" should be -- scores --.

Signed and Sealed this

Twelfth Day of February, 2002

Attest:

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO.   : 5,745,885
DATED        : April 28, 1998
INVENTOR(S)  : Anthony J. Mottola et al.

It is certified that error appears in the above-identified patent and that said Letters Patent is hereby corrected as shown below:

Column 1,
Line 9, "abandoned" should be -- abandoned, --.

Column 5,
Line 13, "$Z_1$," should be -- $Z_1$ --;
Line 18, "extra curricular" should be -- extracurricular --;
Line 29, "undertaken" should be -- undertaking --;
Line 53, "rank" should be -- ranked --.

Column 7,
Line 23, "$y_1 \gamma_{11g} y_2 \gamma_{2g}$" should be -- $y_1 \gamma_{1g} + y_2 \gamma_{2g}$ --;
Line 25, "y' s " should be -- $\gamma$'s --;
Line 43, "points" should be -- point --.

Column 8,
Line 3, "$P(X \in R_2 | \pi 1)$" should be -- $P(X \in R_2 | \pi_1)$ --;
Line 8, "$P(X \in R_1 | \pi 2)$" should be -- $P(X \in R_1 | \pi_2)$ --;
Line 65, "$\pi_1$," should be -- $\pi_1$ --.

UNITED STATES PATENT AND TRADEMARK OFFICE
CERTIFICATE OF CORRECTION

PATENT NO. : 5,745,885
DATED : April 28, 1998
INVENTOR(S) : Anthony J. Mottola et al.

It is certified that error appears in the above-identified patent and that said Letters Patent is hereby corrected as shown below:

<u>Column 9,</u>
Before line 1 should be inserted: -- Allocate $x_0$ to $\pi_1$ if --;
Before line 5 should be inserted: -- Allocate $x_0$ to $\pi_2$ otherwise. --.

<u>Column 14,</u>
Line 23, "score" should be -- scores --.

This certificate supersedes Certificate of Correction issued February 12, 2002.

Signed and Sealed this

Sixteenth Day of April, 2002

*Attest:*

JAMES E. ROGAN
*Attesting Officer*     *Director of the United States Patent and Trademark Office*